United States Patent [19]

Forslund

[11] Patent Number: 4,610,360

[45] Date of Patent: Sep. 9, 1986

[54] INSTALLATION FOR STACKING PILES OF LUMBER SEPARATED BY STICKS

[76] Inventor: Hasse Forslund, Illervägen 7, S-862 00 Kvissleby, Sweden

[21] Appl. No.: 537,392

[22] PCT Filed: Jan. 17, 1983

[86] PCT No.: PCT/SE83/00004
§ 371 Date: Sep. 9, 1983
§ 102(e) Date: Sep. 9, 1983

[87] PCT Pub. No.: WO83/02440
PCT Pub. Date: Jul. 21, 1983

[30] Foreign Application Priority Data

Jan. 19, 1982 [SE] Sweden ............................. 8200273

[51] Int. Cl.$^4$ ................................................ B07C 5/14
[52] U.S. Cl. .................................... 209/518; 209/521; 209/933; 414/42; 414/49; 414/60
[58] Field of Search ............... 209/517, 518, 521, 656, 209/657, 698, 707, 933; 414/42, 45, 48, 49, 60

[56] References Cited

U.S. PATENT DOCUMENTS

| 3,581,891 | 6/1971 | Rysti | 209/517 X |
| 3,631,976 | 1/1972 | Coffeit et al. | 209/518 |
| 3,700,120 | 10/1972 | Romick et al. | 209/517 X |
| 3,823,834 | 7/1974 | Rysti | 414/42 |
| 4,098,407 | 7/1978 | Moore | 209/517 |
| 4,104,156 | 8/1978 | Fletcher | 209/521 |
| 4,144,976 | 3/1979 | Rysti | 414/42 |
| 4,253,787 | 3/1981 | Lunden et al. | 414/42 |
| 4,290,722 | 9/1981 | Rysti et al. | 209/933 X |
| 4,360,303 | 11/1982 | Rysti | 414/42 |

FOREIGN PATENT DOCUMENTS

| 0578589 | 6/1959 | Canada | 414/42 |
| WO79/00215 | 4/1979 | PCT Int'l Appl. | 209/517 |

Primary Examiner—Robert B. Reeves
Assistant Examiner—Edward M. Wacyra
Attorney, Agent, or Firm—Antonelli, Terry & Wands

[57] ABSTRACT

An installation for stacking piles of stick-separated sawn lumber, which includes a number of sink compartments to receive various kinds of lumber and a lumber conveyor in order to bring lumber from a loading point for unsorted lumber to the sink compartment. The lumber conveyor also transports to the sink compartment sticks required for the stick separation of the lumber.

14 Claims, 11 Drawing Figures

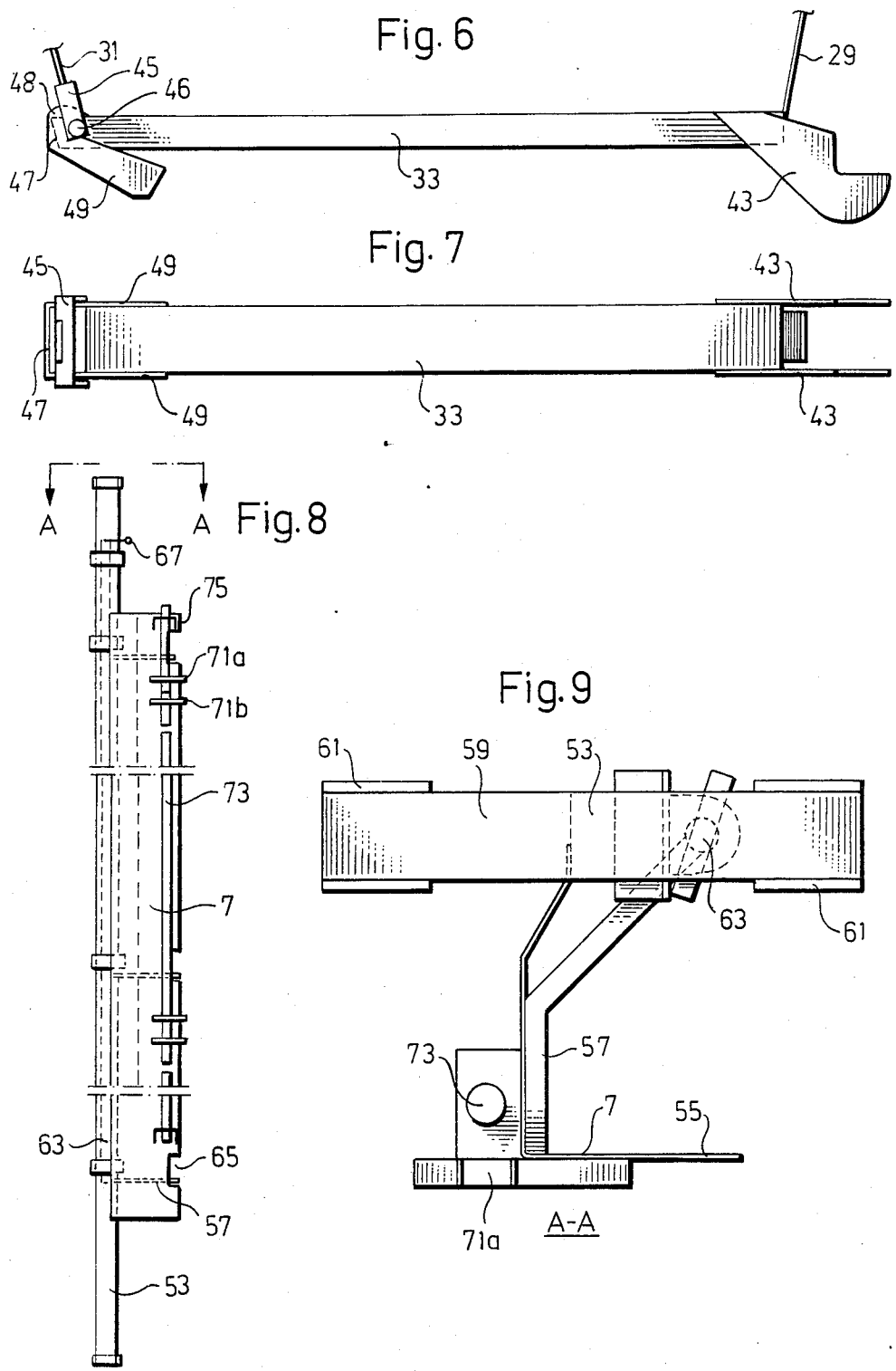

INSTALLATION FOR STACKING PILES OF LUMBER SEPARATED BY STICKS

The present invention primarily concerns installations for the stacking of piles of stick-separated lumber, mainly boards and planks. It is known to sort sawn lumber by means of a lumber conveyor and the so-called sink-compartments, one for each type of lumber, into which the conveyor loads the lumber from above, causing a sink-compartment to descend while it is gradually loaded. In the known installations the lumber carrying part of the sink-compartment is flexible and may be manufactured of belts or similar material. Therefore the stick-laying of the lumber into the sink-compartnent is not possible without having the lumber packets which are removed from the sink-compartment stick-laid in a subsequent operation. Installations for this purpose are known in which the lumber is fed to the pile from one direction, for example from above, while the sticks are fed from another direction, for example from a side, by means of a special stick conveyor and a stick loader.

The main purpose of the present invention is an installation for stacking of the stick-separated lumber piles, in which both the lumber and the sticks are transported and piled by one and the same conveyor.

Another purpose of the invention is to produce an installation by means of which the lumber is deposited in piles at a controlled reciprocal distance between the boards or the planks, so that the piles contain a minimum of empty spaces.

An additional purpose of the invention is to produce an installation of the said type which includes a stick hopper with a device for programmed removal of the sticks by means of the lumber conveyor in measure with the planned delivery of the lumber to the piles.

A further purpose of the invention is to produce a sink-compartment for an installation of the said kind which includes straight cross-beams forming the bottom of the sink-compartment and enabling the stick-laying of the lumber in the sink-compartment itself. These beams can be transferred by means of special devices from their lowest position during the removal of the lumber pile from the hopper to its upper position in which the sink-compartment is ready for a new loading with lumber and sticks.

An installation in accordance with the invention has the characteristics indicated in the claims.

The construction of an installation in accordance with the invention will now be described in detail with reference to the attached drawings. In the drawings FIG. 1 shows an outline of the installation in lateral view.

FIGS. 6 and 7 show from a side and from above, respectively, a lumber-carrying underlayer beam forming part of the sink-compartment.

FIG. 8 shows in lateral view one of the reciprocally matching units forming the lumber and stick conveyor.

FIG. 9 shows on a larger scale and in lateral view the installation according to FIG. 8.

Figure 1:
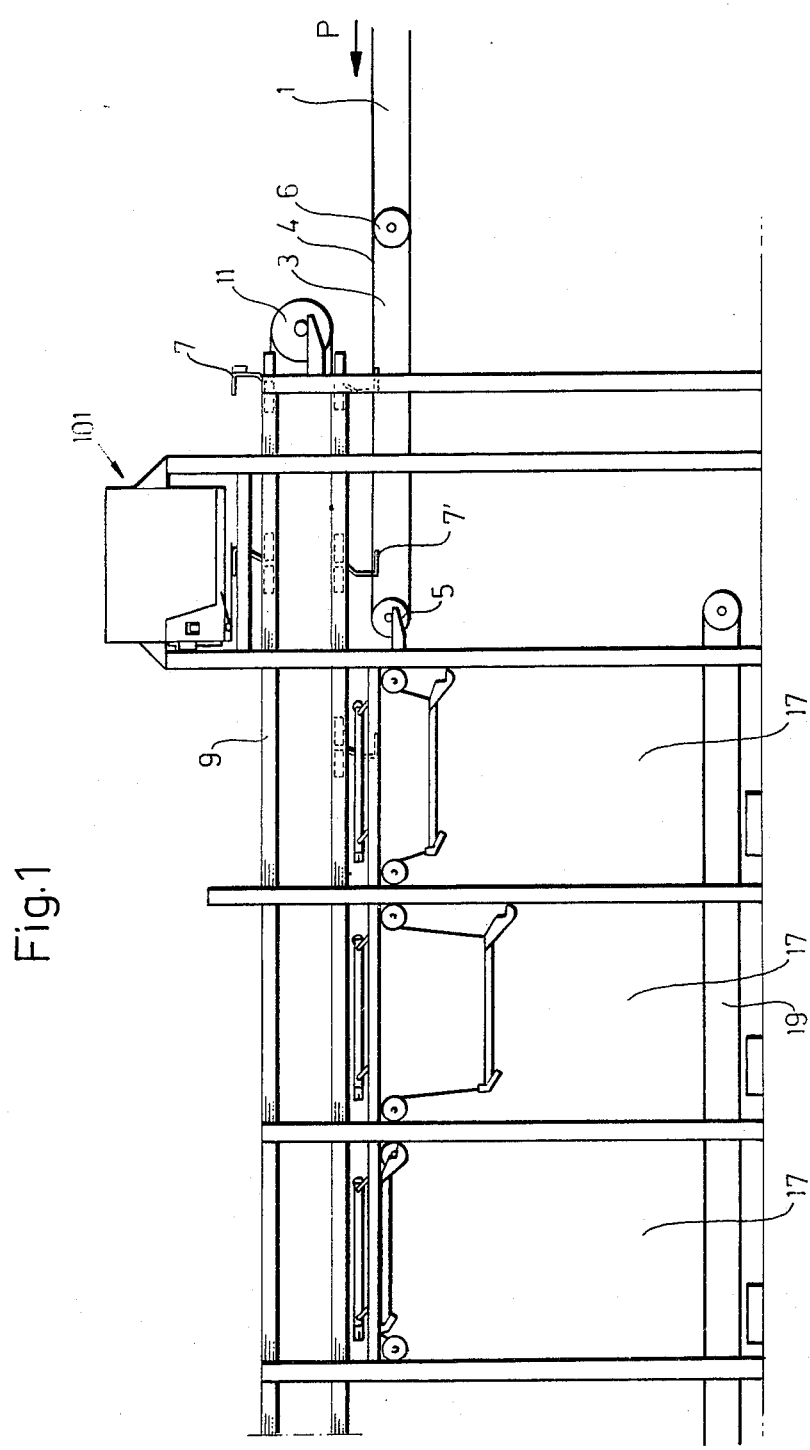
Figure 2:
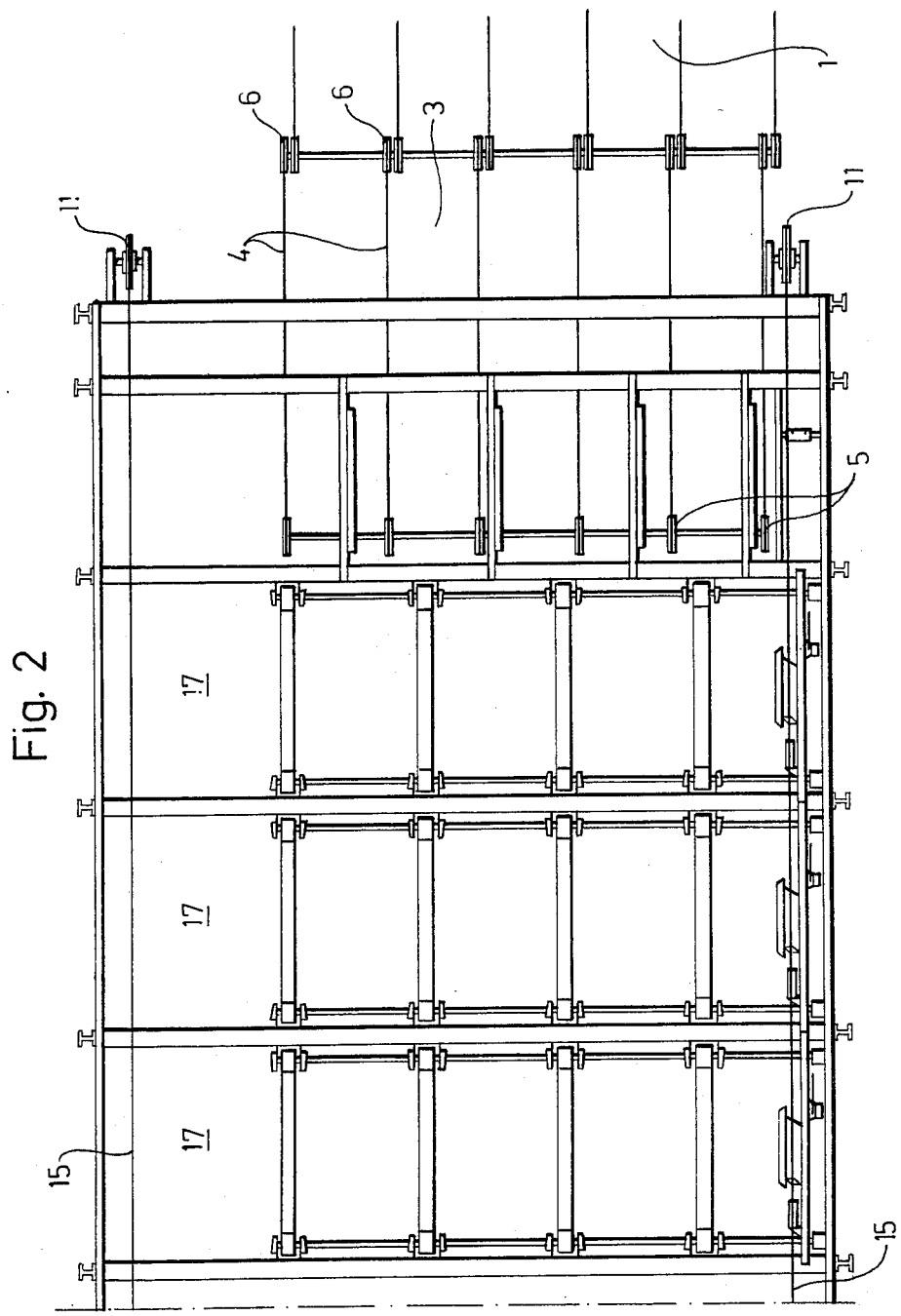
FIG. 2 shows the installation according to FIG. 1 seen from above.

In FIG. 1, the numeral 1 designates a lumber conveyor which, for example, brings the lumber to be piled from a lumber bunker to an acceleration conveyor 3. The latter consists of a number of belts or chains 4 which run over pulleys or sprockets 5 and 6 and are driven by devices not shown in the drawing in an already known manner. The conveyor 3 is arranged to transfer lumber to the lumber conveyor 9 by means of lumber carriers 7 which have a hook-shaped profile, and from now on will be referred to as "lumber hooks". The lumber is transported in the direction of the arrow P (see FIG. 1), in other words in the longitudinal direction, but runs perpendicular to the plane of the paper in FIG. 1, i.e. in the latitudinal direction, and the width of the conveyors 1,3,5 and 9 in said latitudinal direction; these conveyors must therefore be adjusted to the greatests length of the lumber which will be handled by the installation. The lumber conveyors 1 and 9 are driven at a programmed speed; the conveyor 3 is driven at such an increased speed that it always with safety, but without bounding effects, brings in every board or plank to the hook which reaches the receiving position (see hook symbol 7 in FIG. 1). The moving part of the conveyor 9 is carried by two chains 15, one of each long side of the installation; these chains run over a couple of sprockets 11, at the elevated end of the installation, shown in FIG. 1, and over a couple of corresponding but not shown sprockets at the opposite end of the installation.

The hooks 7 deliver the lumber to a number of sink-compartments 17 corresponding to the desired number of lumber types. By 19 is indicated a conveyor for removal from the installation of stick-separated lumber piles from the sink-compartments as the latter are filled.

Figure 3:
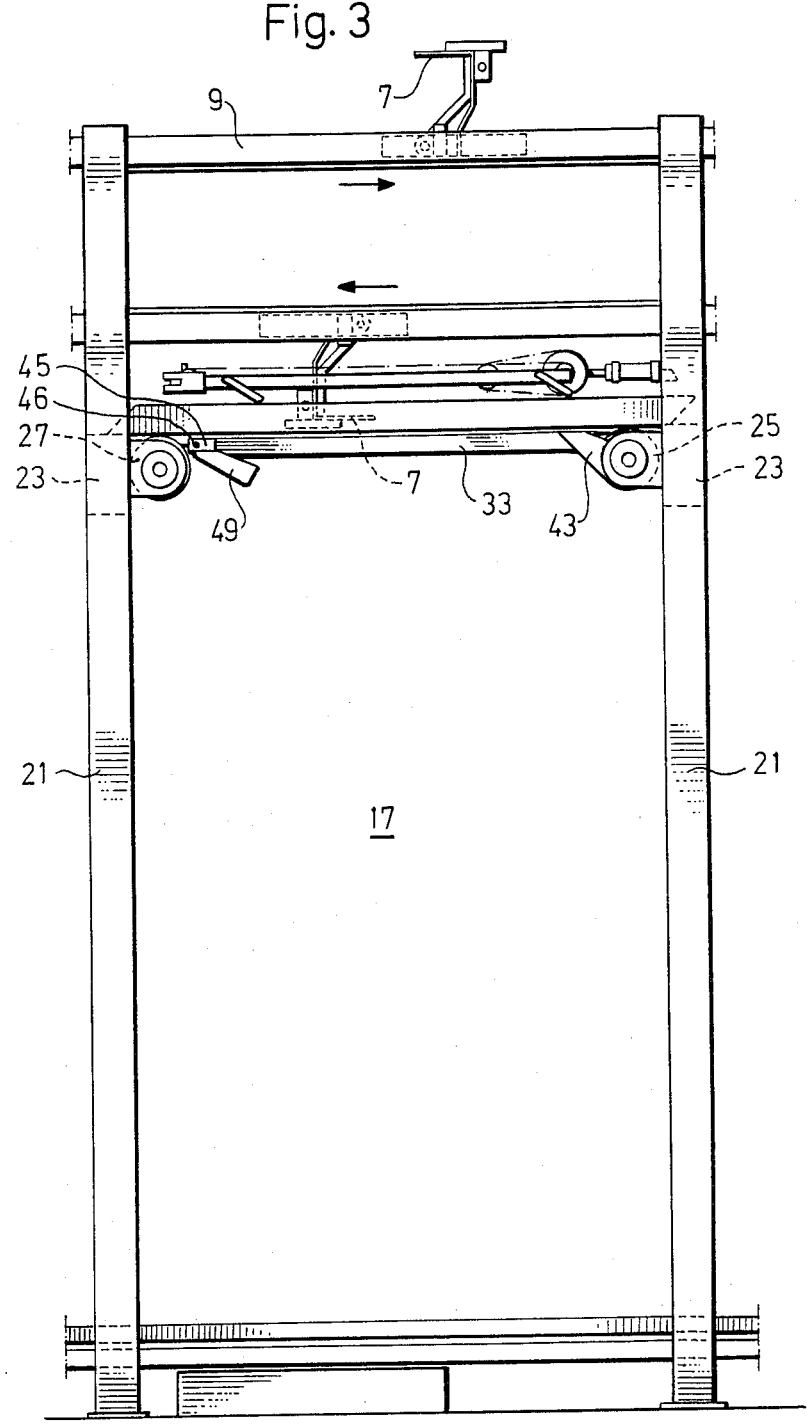
FIG. 3 is a lateral view but on a larger scale than in FIG. 1, of an empty sink-compartment according to the design of the invention together with a section of the lumber and stick conveyor.
Figure 4:
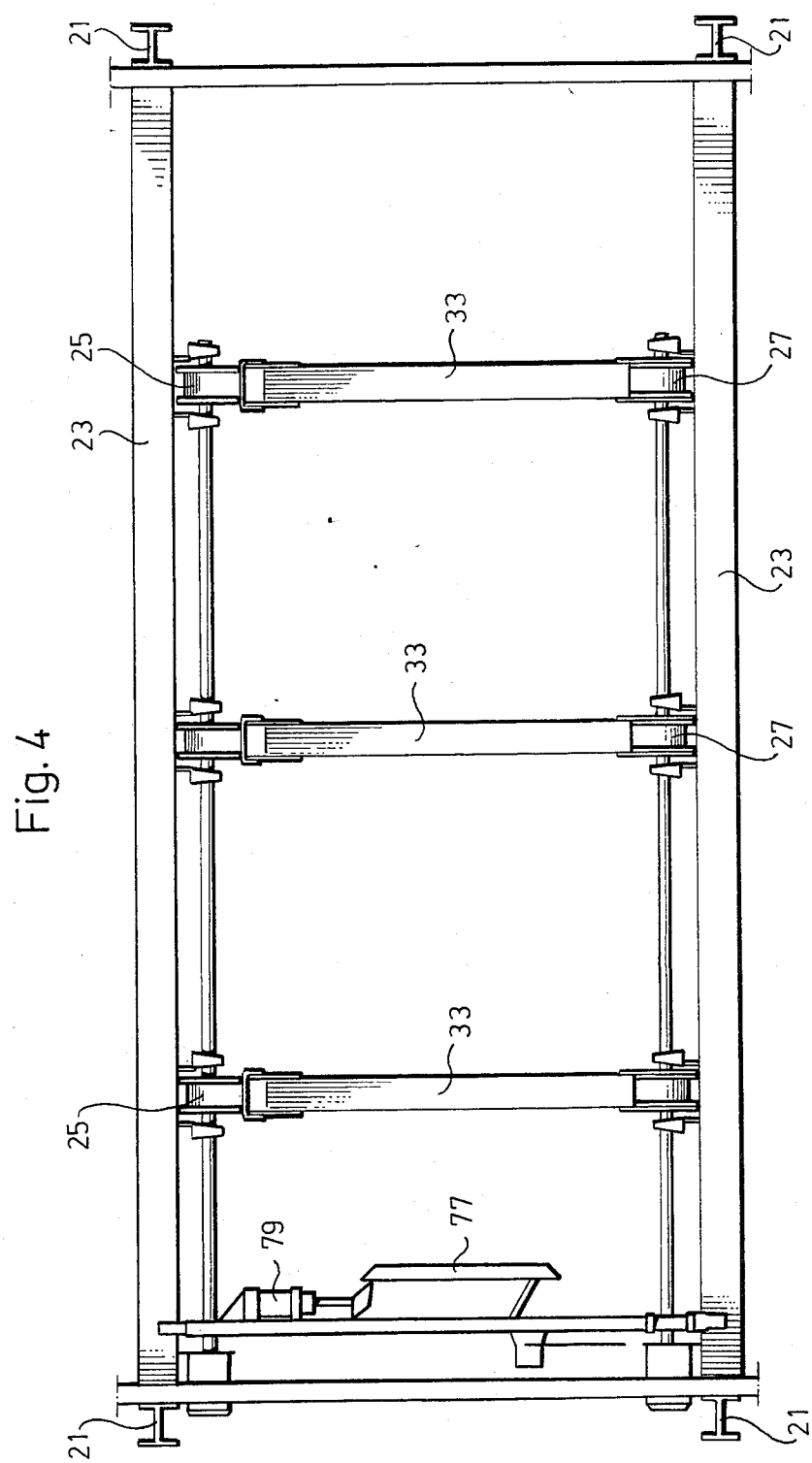
FIG. 4 shows the sink-compartment according to FIG. 1 seen from above.
Figure 5:
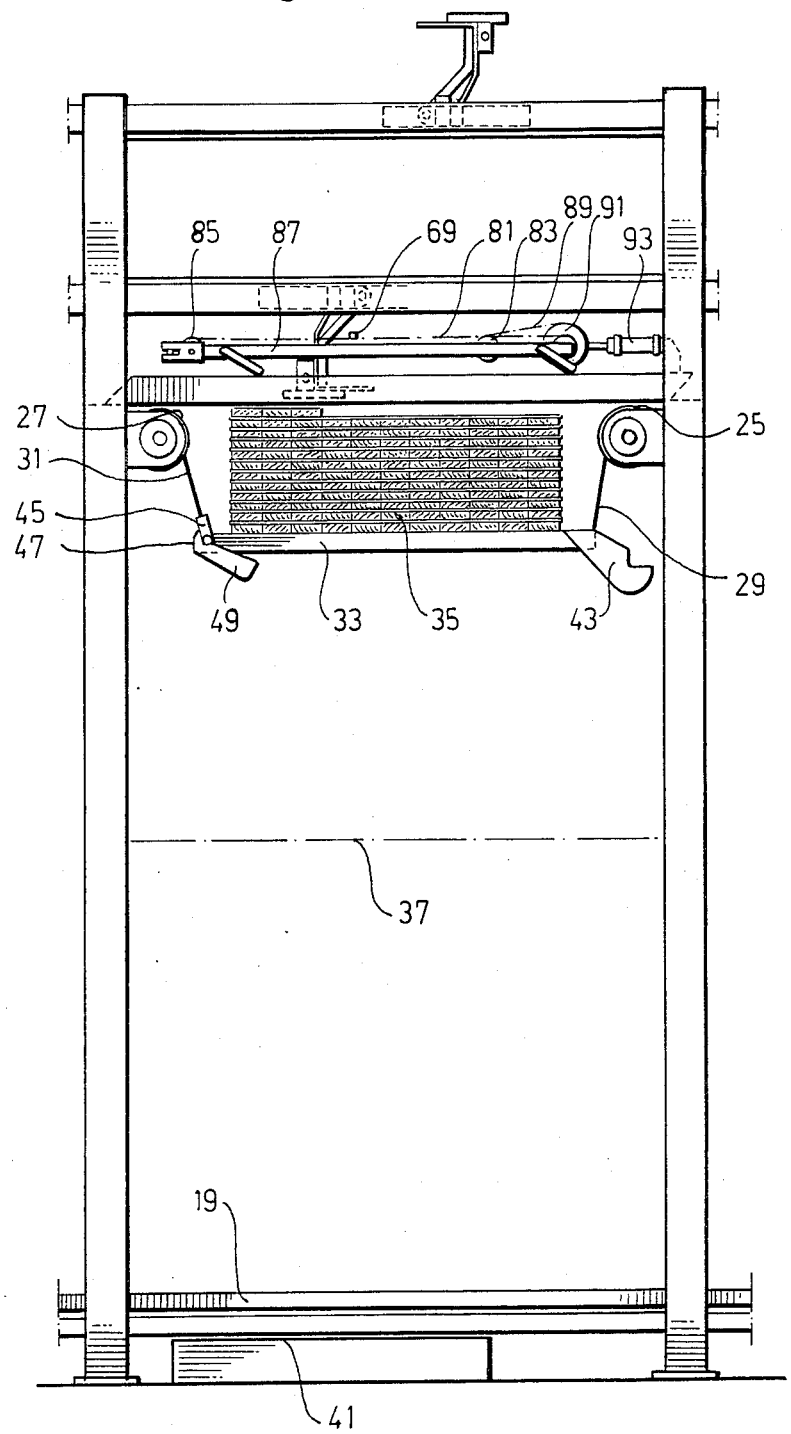
FIG. 5 shows the compartment according to FIG. 3 partly filled with stick-separated lumber.

In FIGS. 3 and 4 is shown, in a scale larger than in FIG. 1 and seen from a side and from above, respectively, a sink-compartment 17 with an overlaying section of the conveyor 9 with lumber hooks 7. The framework of the compartment consists of vertical posts 21 with horizontal beams 23 connecting these posts. On these beams, at a distance from each other, motor-driven rollers are installed designated as 25 at one side of the sink-compartment and as 27 at the opposite side of the compartment respectively. From these rollers the belts 29 and 31, respectively, are rolled on and off (see FIG. 5 which shows a partly filled sink-compartment). The belts 29 are permanently connected to one end of each underlaying beam 33; together these beams form the bearing underlaying for the lumber pile 35 (FIG. 5). The belts 31 are detachably connected to the opposite end of the corresponding underlaying beam 33. As the lumber is loaded into the sink-compartment the belt length increases in a controlled manner from the rollers 25 and 27, holding all the underlayer beams constantly in reciprocally the same horizontal plane. When the underlayer beams 33 come down approximately to a level of the dotted line 37 (FIG. 5), the compartment is fully loaded and the belts 29 and 31 are then further stretched so that the lumber pile 35 sinks down to the conveyor 19 for the removal of the completed pile. Then the underlayer beams 33 are detached from the connection to the belts 29 and the beams can be moved to the initial position according to FIG. 3 in the manner described below.

The detachable connection between the underlaying beam 33 and the belt 31 includes one at the end of the belt 31 attached hoop-like part 45, with a transverse axle 46, and one on the beam revolvingly attached hook 47 with a couple of obliquely down-turned wings 49. When the lumber pile sinks to the removal conveyor 19 the wings 49 push against stop 41 at the bottom of the bunker and thus the hook 47 is released from the hoop-axle 45. Both belts 29 and 31 may then be re-rolled on the rollers 25 and 27, respectively. The underlayer beam 33 now follows the belt 29 until its end, which is connected to the beam by means of the belt, reaches the roller 25; after that the beam is turned clockwise so that its opposite end, the one equipped with the hook 47, comes in contact with the hoop-part 45 of the belt 31, and the belt 31 is rolled maximally upon the roller 27 and is fixed in the position shown in FIG. 3. The plane 48 of the exterior of the hook 47 pushing against the axle 46 of the hoop 45 is designed in such a manner that the hook is automatically swung away by pressure upon the axle 46 after which the hook is automatically swung back, due to the weight of the wings 49 or by spring power, and is connected to the axle 46 of the hoop. Turning of the underlayer beam 33 to its horizontal position by means of roller 25 is ensured by a stop 43 attached to the beam 33. Driving of roller 25 and 27 may be carried out by a hydraulic power source.

The conveyor 9 for the lumber and sticks must be described first in respect of the transportation and piling of the lumber in the sink-compartment. From the position of the lumber hook symbolized in FIG. 1 as 7 and loaded with lumber, for example a board or plank, in an already described manner, this hook is moved to the left (as seen in FIG. 1) and moves to a position above the bunker for the lumber type to which the type of lumber in question belongs. The lumber is deposited there.

The procedure for the deposition or landing is best described from FIGS. 5, 8 and 9. In FIG. 9 is shown a lumber hook 7 with a lumber fender 57 and a device to grasp and deposit sticks. The lumber hook 7 has a base part 51 attached by a transverse beam 53 and a straight horizontal lumber-receiving part 55. As appears from FIG. 8 the "hook" is designed in the plant itself as a flanged plate which stretches transversally to the installation; this is done for the reason that the lumber which is transported should be supported along its entire length in order that the hanging-down of the lumber between the hook and the operational disturbances caused by such hanging should be avoided. The beam 53 is also connected to the controlling element 59 with slide edges 61, in order that the beam and thus the lumber hooks should always be kept in the proper position. The lumber fender 57 is mounted upon a turning, transversal axle 63 which is supported by the beam 53 and reaches down to the lumber carrying surface 55 of the hook 7; this surface in the area of the lumber fender 57 shows a slot 65 through which the tail-end of the fender can pass when the fender is turned clock-wise according to FIG. 9, in order to fend off or deposit the lumber which is present on the surface of the hook 55. The turning is caused by an arm with a stop 67 upon one end of the axle 63, which meets an adjustable stop 69 at a sink-compartment (see FIG. 5).

The stop 69 is installed on a chain 81 which is laid around two sprockets 83 or 85 with horizontal axles mounted on a rod 87 which is parallel-controlled, so that it is always kept horizontal. On the rod 87 is also mounted a sprocket on a stage motor 91 or similar motor and which by means of a chain drives a sprocket which is coupled to the sprocket 83. The stage motor 91 moves the stop 69 step by step to the right (according to FIG. 5) depending on data for the position and width of the preceding deposited lumber. These data are supplied to a computer included in the installation. This computer is designed so that the stop 69 is moved in stages only as much as is required to obtain the lumber density desired for each individual case for the lumber packet.

When removal is due the hydraulic motor 93 is actuated whereby the rod 87 moves upwards and the stop 69 acts upon the stop 67 (see FIG. 8).

The hydraulic motor 93, just as the other mentioned hydraulic driving device may of course be replaced by a pneumatic, electric or other alternative driving device when found convenient.

The lumber hook 7 is equipped with stick carriers consisting of two clamps 71a and 71b, one of which 71b is supported by a rod 73 which is movable in the latitudinal direction of the installation, which rod in its turn is supported by a lumber hook supported by a lug 75 designed with a corresponding hole. The other clamp 71a is supported by the lumber hook 7 and has a hole for the rod 73. The clamp 71b is made somewhat resilient in the direction of the rod by means of a helical spring to accommodate the occurring width variations of the sticks. The rod 73 is movable in its longitudinal direction and is held by a helical spring pressing to the right according to FIG. 8 in order to catch and hold a stick between the clamps 71a and 71b, and it is movable in opposite direction in order to let go of a grasped stick. The latter displacement occurs in that the upper end of the rod is acted upon by an adjustable stop 77 of the sink-compartment into which the stick is to be loaded (see FIG. 4). The stop 77 is elongated in the transportation direction of the lumber and is parallel-controlled and activated by a hydraulic motor 79 when a stick is to be supplied into the sink-compartment in question, whereby the stop 77 moves to the right according to FIG. 4, and presses against the rod 73 upon the lumber hook supplied with stick, the hook being exactly above the sink-compartment. The motor 79 receives control signals from a computer which is not shown here, and which is arranged to control all the important functions of the installation. For each complete layer of lumber (except the last one) which is delivered to the sink-compartment the sticks are placed upon a layer of lumber, if desired, and loading of a new lumber layer may then begin.

It should be pointed out here that the control devices for checked unrolling of belts 29 and 31, FIG. 5, from the rollers 25 and 27, respectively, are designed, in dependence of the control signals which indicate the position of the upper surface of the lumber packet 35, to slacken the belts 29 and 31 in step with the loading of lumber and sticks only so much that a relatively small distance is maintained between the lumber hooks 7 and the upper surface of the lumber packet, thus making a jolt-free and gentle unloading of the lumber possible.

Figure 10:
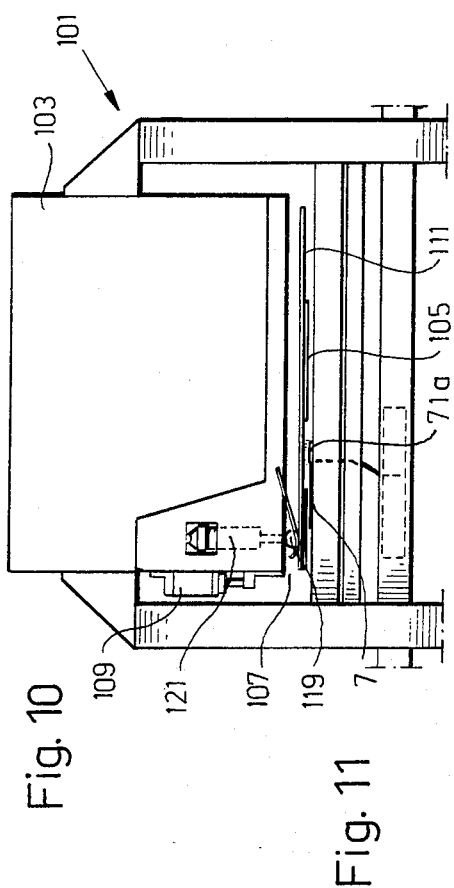
FIG. 10 shows on a somewhat larger scale than FIG. 1 and in lateral view, a stick hopper with an unloading device included in the installation.
Figure 11:
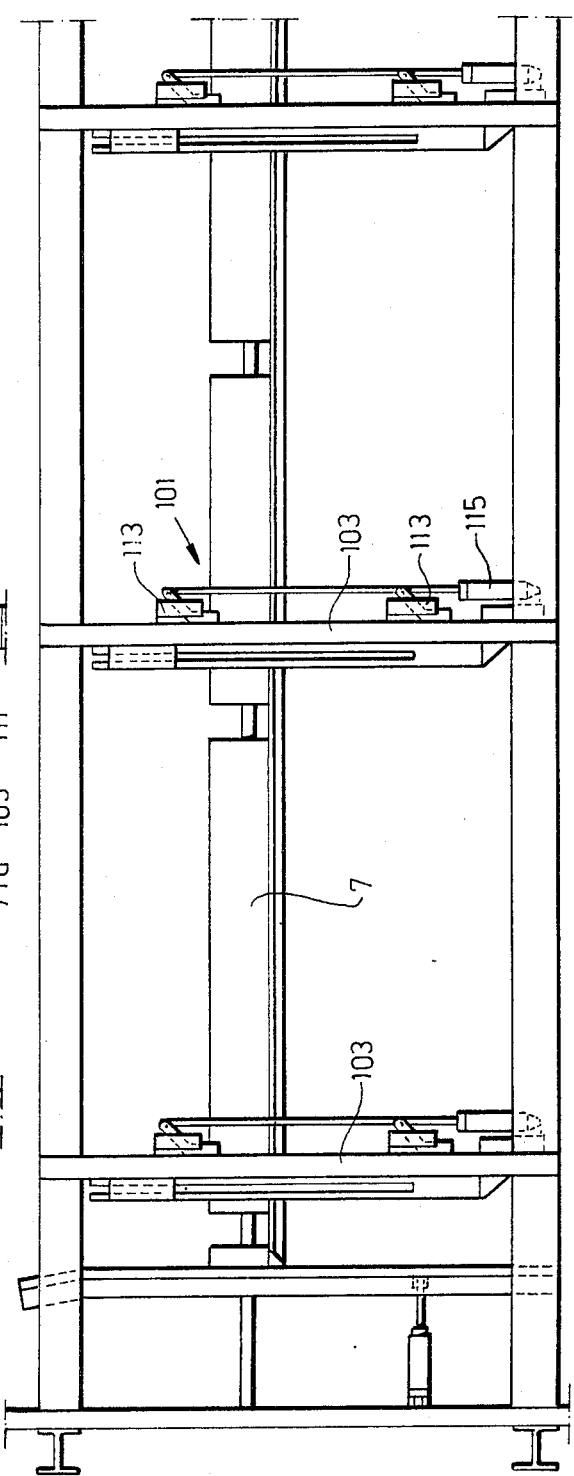
FIG. 11 shows from above the section of the installation which contains the predetermined number of stick hoppers according to FIG. 10.

The stick hopper 101 with unloading devices shown in FIG. 1 is shown in a somewhat larger scale in FIGS. 10 and 11.

103 designates the stick hopper designed to hold a large number of sticks piled on each other with a width somewhat smaller than the interior width of the hopper. The bottom stick rests on the bottom of the hopper which in this area has a deep slot in both side walls. Through one of the slots the bottom stick, by means of a stick unloader 113 driven by a hydraulic cylinder 115, can be laterally unloaded from the hopper and placed upon a horizontal tongue 105 on a stick unloader 107 in the upper position of the latter. The stick unloader may be shifted between the upper and the lower positions by means of a hydraulic motor 109. In FIG. 10 the stick unloader is in its lower position. In this position, in which the stick 111 resting upon the tongue 105 is retained by easy pressure from clamp 119 which is activated by a hydraulic cylinder 121, the stick 111 can be caught by clamps 71a and 71b of the lumber hook 7. These clamps are moved apart by the movement of rod 73, see FIG. 8, when the end of this rod is actuated by a computer-controlled pressure device, the design of which is not shown since it can be easily constructed in various ways by a specialist. Said pressure device can be designated to permit joining of the clamps 71a and 71b when a stick is to be grasped, but to prevent such joining when a stick is not to be grasped. Alternatively, the device can be designed so as, after a separation of clamps, always to permit the latter to be joined when the lumber hook comes to a certain predetermined position under the stick hopper. In doing so it is left to the stick unloaders 113 and 115 to determine whether a stick should be grasped and taken along by the lumber hook or not.

It should be mentioned that the lumber hook 7 is laterally located between the bands 4 of the feeding conveyor 3, so that the sticks grasped by the lumber hooks have free space between the bands 4 for the passage down at the end 11 of the conveyor 9.

The above invention in connection with its design presents a considerable improvement in the technology of the production of piles or bundles of stick-laid lumber. In an installation as described according to the invention, manual labour is required basically only for supervision of the operation of the installation and for the loading of sticks into the stick-hopper. By using a single conveyor for the transport of both the lumber and the sticks to the sink-compartment, and by enabling the stick-laying already in the sink-compartment, the purpose is achieved of building up piles of stick-laid lumber with a very simple installation which alone replaces several and more complicated known devices. In the installation according to the invention the lumber is very gently handled from the loading to the unloading of the finished lumber pile, thus making the losses of lumber small.

Control of various functions mentioned above takes place by means of computer equipment which is not shown nor described in detail here. Preferably, the computer, which may be of conventional type, is fed with data from a source prior to the loading of the lumber; primarily data concerning the length and width of the lumber and, where required, the thickness of the lumber. On the basis of these data the computer calculates the quantity of lumber that can be stored in various compartments and in various layers in each compartment and gives corresponding out-signals to the devices which control various functions of the installation. After the width for the loading is determined the computer calculates, for example, whether a particular board will have room enough in an already started layer of lumber in the corresponding compartment. If the remaining space in the layer is sufficient for the board a signal is given for depositing the board into the compartment. If the remaining space is insufficient a signal is given for the deposit of sticks upon the layer of boards and thereafter the board is deposited as the first board in the next layer of boards and so on. The entry data to the computer are delivered at such an early stage that the computer can properly plan various functions of the installation.

The invention is not limited to the shown and described design, since this can be varied and modified in many ways within the scope of the invention.

I claim:

1. An installation for production of piles of lumber, each pile comprising a plurality of layers of lumber with adjacent layers being separated by sticks, which installation includes a number of sink-compartments (17) to receive various lumber types and a lumber conveyor (9) to bring lumber from a loading point of unsorted lumber to a selected sink compartment, said lumber conveyor further being designed to bring the sticks (111) that are required for separating adjacent layers to the selected sink-compartment, and wherein the lumber conveyor includes a couple of endless chains (15) which are laid around sprockets (11) located in one and the same horizontal plane and continue over all the sink-compartments (17) and which chains between them support a means (71a, 71b) for grasping and fetching said sticks from a stick hopper (103) and for depositing the grasped sticks in a selected sink-compartment.

2. An installation according to claim 1, characterized in that said device consists of clamps (17a, 17b) arranged in pairs, which clamps are supported by lumber hoods (7), the clamps in such a pair being placed upon a rod (73) which is longitudinally movable and also movable across the transport direction of the lumber, said rod being installed in a manner to be affected by a device at said stick hopper (103) and at the sink-compartment (17) in order to grasp and release the sticks, respectively, by means of said clamp.

3. An installation according to claim 2, characterized by means (113,115,105,107) for feeding sticks one by one from the stick hopper and for placing the fed stick into position to be grasped by said stick grasping device (17a,17b).

4. An installation for production of piles of stick-laid sawn lumber, including a plurality of sink-compartments to receive various types and/or sizes of lumber, a lumber conveyor to bring lumber from a loading point of unsorted lumber to the sink-compartments, means mounted on said lumber conveyor to carry the lumber, clamp means associated with said lumber carrying means for grasping and fetching sticks from a stick hopper and for transporting and depositing the grasped sticks in a selected sink-compartment perpendicular to the deposited lumber therein.

5. An installation according to claim 4, wherein said lumber carrying means comprises hooks mounted on said lumber conveyor, and said clamp means comprises clamps arranged in pairs and supported by said hooks, each pair of clamps being mutually movable perpendicular to the transport direction for grasping and releasing the sticks.

6. An installation according to claim 5, wherein said lumber conveyor includes endless chain means disposed around sprockets located in the same horizontal plane and running the length of the sink-compartments, said endless chain means supporting said hooks.

7. An installation according to claim 6, wherein said clamp means includes a rod extending perpendicular to the transport direction of the lumber and movable in its longitudinal direction, said clamps being located on said rod and means positioned at the stick hopper and at the sink-compartments for causing movement of said rod and thereby grasping and releasing, respectively, of the sticks by said clamps.

8. An installation according to claim 7, wherein means are provided for feeding sticks one by one from the stick hopper and for placing each fed stick into a position to be grasped by said clamp means.

9. An installation according to claim 5, wherein a plurality of fenders loads lumber from said hooks to a selected one of said sink-compartments, a stopper is movable in the longitudinal direction of said lumber conveyor and actuates said fenders, said stopper being selectively positioned on an endless chain for depositing the lumber at predetermined intervals.

10. An installation according to claim 4, wherein said sink-compartments include a plurality of straight underlayer beams for a lumber pile, means for supporting both ends of said beams, and motor-driven roller means for rolling on or rolling off said beam supporting means.

11. An installation according to claim 10, wherein cut-off coupling means is provided for connecting each of said underlayer beams to said beam supporting means, whereby, after a sink-compartment has been filled with lumber and said coupling means has been uncoupled, the associated beam is able to be returned to an upper horizontal position and said coupling means is re-engaged when said belt supporting means are rolled on to the maximum extent by the associated motor driven roller means.

12. An installation according to claim 11, wherein auxiliary means is provided for positioning said underlayer beams in the upper horizontal position.

13. An installation according to claims 11 or 12, wherein said coupling means is auto-engageable when said underlayer beams are adjustable to their upper horizontal positions.

14. An installation according to claim 4, wherein computer means having means for sensing dimensions of the supplied lumber is provided to calculate and control loading of lumber and sticks in a predetermined manner into said sink-compartments on the basis of data corresponding to the sensed dimensions.

* * * * *